United States Patent
Swinson et al.

(10) Patent No.: US 12,079,830 B2
(45) Date of Patent: *Sep. 3, 2024

(54) SYSTEM AND METHOD FOR DETERMINATION AND USE OF SPATIAL AND GEOGRAPHY BASED METRICS IN A NETWORK OF DISTRIBUTED COMPUTER SYSTEMS

(71) Applicant: TrueCar, Inc., Santa Monica, CA (US)

(72) Inventors: Michael D Swinson, Santa Monica, CA (US); Lin O'Driscoll, Mammoth Lakes, CA (US); Daniel Salazar, Torrance, CA (US); Ludovica Rizzo, Los Angeles, CA (US); Jacob LaCivita, Austin, TX (US)

(73) Assignee: TrueCar, Inc., Santa Monica, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 17/520,191

(22) Filed: Nov. 5, 2021

(65) Prior Publication Data
US 2022/0058673 A1    Feb. 24, 2022

Related U.S. Application Data

(63) Continuation of application No. 16/818,585, filed on Mar. 13, 2020, now Pat. No. 11,205,187, which is a
(Continued)

(51) Int. Cl.
*G06Q 30/00* (2023.01)
*G06Q 10/0637* (2023.01)
(Continued)

(52) U.S. Cl.
CPC ...... *G06Q 30/0205* (2013.01); *G06Q 10/0637* (2013.01); *G06Q 30/0278* (2013.01); *G06Q 30/06* (2013.01)

(58) Field of Classification Search
CPC .......... G06Q 30/0205; G06Q 10/0637; G06Q 30/0278; G06Q 30/06
See application file for complete search history.

(56) References Cited

U.S. PATENT DOCUMENTS 8,428,985 B1 * 4/2013 Puskorius .............. G06Q 10/00
705/7.11
8,620,763 B2 * 12/2013 Sullivan ........... G06Q 10/06398
705/14.69
(Continued)

OTHER PUBLICATIONS

"A Data Management Perspective on Vehicular Networks". IEEE. 2019. (Year: 2019).*
(Continued)

*Primary Examiner* — Maria V Vanderhorst
(74) *Attorney, Agent, or Firm* — Sprinkle IP Law Group

(57) ABSTRACT

Embodiments of vehicle data systems for use in distributed computer network are disclosed. Particular embodiments may determine and enhance vehicle data from various data sources distributed across the computer network, and utilize the enhanced vehicle data in the determination of normalization metrics that account for geography and population density or spatial behavioral patterns. Embodiments may utilize these normalization metrics to assign zone labels to geographic areas and present representations of the geographic areas based on the normalization metrics across the distributed computer network.

18 Claims, 7 Drawing Sheets

Related U.S. Application Data continuation of application No. 15/711,806, filed on Sep. 21, 2017, now Pat. No. 10,628,841.

(60) Provisional application No. 62/398,305, filed on Sep. 22, 2016.

(51) Int. Cl.
  *G06Q 30/02* (2023.01)
  *G06Q 30/0204* (2023.01)
  *G06Q 30/06* (2023.01)
  *G05B 19/418* (2006.01)

(56) References Cited

U.S. PATENT DOCUMENTS

| | | | | |
|---|---|---|---|---|
| 8,868,480 B2* | 10/2014 | McBride | ............ | G06Q 30/0202 706/45 |
| 10,546,337 B2* | 1/2020 | Chrzan | .............. | G06Q 30/0206 |
| 2007/0205276 A1* | 9/2007 | Sodan | ................ | G06Q 30/0205 235/383 |
| 2013/0173330 A1 | 7/2013 | Puskorius et al. | | |
| 2014/0074553 A1* | 3/2014 | Sullivan | ............. | G06Q 30/0203 705/7.29 |
| 2015/0310466 A1* | 10/2015 | LaCivita | .............. | G06Q 10/087 705/7.34 |
| 2016/0225062 A1* | 8/2016 | Inman | ................ | G06Q 30/0631 |
| 2016/0253682 A1* | 9/2016 | Inman | ................ | G06Q 30/0201 705/7.29 |
| 2018/0082316 A1 | 3/2018 | Swinson et al. | | |
| 2018/0189812 A1 | 7/2018 | Swinson et al. | | |
| 2019/0019131 A1 | 1/2019 | O'Keefe et al. | | |
| 2021/0158382 A1 | 5/2021 | Swinson et al. | | |

OTHER PUBLICATIONS

Restriction Requirement issued for U.S. Appl. No. 17/165,584, mailed Jan. 27, 2022, 6 pages.

Office Action issued for U.S. Appl. No. 15/855,542, issued on Jul. 22, 2020, 10 pages.

Office Action issued for U.S. Appl. No. 17/165,584, mailed Apr. 26, 2022, 24 pages.

Office Action issued for U.S. Appl. No. 17/165,584, mailed Nov. 4, 2022, 11 pages.

Office Action issued for U.S. Appl. No. 17/165,584, mailed Mar. 2, 2023, 10 pages.

Office Action issued for U.S. Appl. No. 17/165,584, mailed Jun. 15, 2023, 11 pages.

Office Action issued for U.S. Appl. No. 17/165,584, mailed Oct. 12, 2023, 7 pages.

Notice of Allowance issued for U.S. Appl. No. 17/165,584, mailed Feb. 16, 2024, 8 pages.

Notice of Allowance issued for U.S. Appl. No. 17/165,584, mailed Jun. 12, 2024, 8 pages.

* cited by examiner

SYSTEM AND METHOD FOR DETERMINATION AND USE OF SPATIAL AND GEOGRAPHY BASED METRICS IN A NETWORK OF DISTRIBUTED COMPUTER SYSTEMS

RELATED APPLICATIONS

This application is a continuation of and claims a benefit of priority under 35 U.S.C. 120 of the filing date of U.S. patent application Ser. No. 16/818,585, filed Mar. 13, 2020, issued as U.S. Pat. No. 11,205,187, entitled "System and Method for Determination and Use of Spatial and Geography Based Metrics in a Network of Distributed Computer Systems," which claims a benefit of priority under 35 U.S.C. 120 of the filing date of U.S. patent application Ser. No. 15/711,806, filed Sep. 21, 2017, issued as U.S. Pat. No. 10,628,841, entitled "System and Method for Determination and Use of Spatial and Geography Based Metrics in a Network of Distributed Computer Systems," which claims the benefit of priority under 35 U.S.C. § 119 to U.S. Provisional Application No. 62/398,305, entitled "System and Method for Quantification and Use of Spatial and Geography Based Metrics in a Network of Distributed Computer Systems," filed Sep. 22, 2016, which are hereby fully incorporated by reference herein for all purposes.

COPYRIGHT NOTICE

A portion of the disclosure of this patent document contains material that is subject to copyright protection. The copyright owner has no objection to facsimile reproduction of the patent document or the patent disclosure as it appears in the Patent and Trademark Office patent file or records, but otherwise reserves all copyright rights thereto.

TECHNICAL FIELD

The present disclosure relates generally to distributed and networked computer systems. More particularly, the present disclosure relates to the use of distributed and networked computer systems in the collection and enhancement of data in a distributed network environment and the use of the enhanced data for the determination and use of geography based metrics. Even more specifically, the present disclosure to improving the use of distributed and networked computer systems for the collection and enhancement of data used in the determination and utilization of geography based metrics which may be usefully applied in a variety of contexts, including in the context of vehicle sales.

BACKGROUND

In many instances, consumers do not have information relevant to a specifically desired product or do not understand such information. Exacerbating this problem is the fact that complex, negotiated transactions can be difficult for consumers to understand due to a variety of factors, including interdependence between local demand and availability of products or product features, the point-in-time in the product lifecycle at which a transaction occurs, and the interrelationships of various transactions to one another.

Sellers may experience similar difficulties but from an opposite perspective. It is often time difficult to determine or predict the behavior of buyers. This difficulty in no small part stems from the fact that behavioral patterns of buyers vary widely with geography. These circumstances can be seen in a variety of contexts. In particular, the automotive transaction process may entail complexity of this type, as the distribution of dealers and consumers can vary widely based on geography.

However, these circumstances have not tempered the desired for effective analysis of the vehicle marketplace. Historically, the vehicle market was analyzed defining distance brackets (e.g. 15, 30 and 60 miles radii) and all performance indicators for data analysis in the vehicle marketplace were calculated for those distance brackets (e.g. close rate in 15 miles; conversion rates in 60 miles around a zip code) for the whole nation, with no regard to the relevance of such distances to the local market. This methodology rendered rather poor predictions.

These poor predictions are not surprising at least because, as discussed, behavioral patterns vary across the nation due to population and car dealer densities, as well as connectivity (e.g., number and types of roads or other transport mechanisms). As a consequence, a journey of 30 miles (e.g., to a vehicle dealer) or more in rural areas is rather common, whereas such a distance is far beyond the typical journey of an urban customer. Even if urban customers are considered, however, the typical distance driven varies by neighborhood and car brand (make). For example, the distance travelled for a consumer to find an Alfa Romeo dealership may typically be much farther than the distance travelled to find a Ford dealership, even for urban consumers. Thus, behavioral patterns vary across the nation due to population and car dealer densities as well as connectivity.

As market key indicators (e.g., demand, conversion and close rates, market share, etc.) are currently determined based on distance of dealers or consumers, all predictions are subject to substantial noise coming from the variability described above, hence the prediction accuracy of such indicators or other values are rather low. As one example, when it is desired to predict close rate based on distance, samples from rural places will have highly different close rates than samples from urban environments for the exact same distance. This is detrimental to prediction accuracy since it introduces noise.

On the other hand, if it is decided to segment by region type, prohibitively small samples for some makes may result. The current methods for the determination of market indicators in the vehicle sales context thus adversely affects the abilities of participants in the industry to provide accurate analysis of the marketplace. This situation is particularly germane to those participants that may maintain networks of dealerships or provide dealer or consumer facing products that rely on the accuracy of those marketplace analytics, such as TrueCar, Inc.

There are therefore a number of unmet desires when it comes to obtaining, analyzing and presenting vehicle pricing data. In particular, it is desired to provide metrics that account for density of population and density of dealerships for various makes in the context of the vehicle marketplace. Specifically, what is desired are computerized systems and methods for determining such metrics that can obtain, manage and process large amounts of data available across a wide variety of distributed computer systems and efficiently process obtained data to establish high-fidelity metrics that are accurately reflective of real-world conditions and that may be used to distribute market indicators or other data across a network in real-time.

SUMMARY

To that end, among others, attention is thus directed to the systems presented here, which provide for the determination of one or more normalization metrics that account for geography and population density or spatial behavioral patterns of consumers. In particular, embodiments may obtain data from a variety of data sources across a distributed network and enhance data records by correlating the data obtained from these distributed sources. This data can then be used to determine these normalization metrics. Such normalization metrics may be one or more quantifiers of the effect of spatial distribution of consumers or dealers holding other factors equal.

These metrics may provide a normalized way of comparing and understanding spatial behavioral patterns of car buyers and its links to competitiveness of car dealers. These metrics may be utilized in the computation of one or more performance metrics such as close rate or the like to account for these spatial differences when performing the determination of these performance metrics. Moreover, the normalization metrics may be utilized to assign a geographic area to a particular zone for a dealer (e.g., relative to one or more other dealers).

These metrics or geographic areas associated with the dealer can be presented to a user in a visual display in real-time, or may be used to determine, in real-time data to be presented to the user in a visual display. For example, a graphical display in an interface presented to a user may present zone labels for a set of zip codes in the vicinity of the dealer. Such a presentation may include, for example, a depiction of a zip code map and a color coded presentation of the zone labels along with graphical depiction of the various dealers in the geographic region.

Embodiments thus provide a variety of technological advantages, including the collection, correlation and enhancement of data from a variety of distributed sources. Moreover, embodiments may enable the efficient and speedy determination of normalization metrics that may be utilized in real-time to present individualized dealer data related to geography.

In particular, it has heretofore been virtually impossible to provide, in real-time over a distributed computer network, interfaces and data specific to a particular dealer where those interfaces quantify and classify geographic areas specifically for an individual dealer. As a result of the architecture and methods utilized by embodiments of vehicle data systems as presented herein, the same type of interface may be provided, in real-time, over a distributed computer network to a number of dealers where the interface may be tailored to present the classification and qualification of geographic regions specific to that dealer through the interface.

These, and other, aspects of the invention will be better appreciated and understood when considered in conjunction with the following description and the accompanying drawings. The following description, while indicating various embodiments of the invention and numerous specific details thereof, is given by way of illustration and not of limitation. Many substitutions, modifications, additions or rearrangements may be made within the scope of the invention, and the invention includes all such substitutions, modifications, additions or rearrangements.

BRIEF DESCRIPTION OF THE DRAWINGS

The drawings accompanying and forming part of this specification are included to depict certain aspects of the invention. A clearer impression of the invention, and of the components and operation of systems provided with the invention, will become more readily apparent by referring to the exemplary, and therefore nonlimiting, embodiments illustrated in the drawings, wherein identical reference numerals designate the same components. Note that the features illustrated in the drawings are not necessarily drawn to scale.

DETAILED DESCRIPTION

The invention and the various features and advantageous details thereof are explained more fully with reference to the nonlimiting embodiments that are illustrated in the accompanying drawings and detailed in the following description. Descriptions of well-known starting materials, processing techniques, components and equipment are omitted so as not to unnecessarily obscure the invention in detail. It should be understood, however, that the detailed description and the specific examples, while indicating preferred embodiments of the invention, are given by way of illustration only and not by way of limitation. Various substitutions, modifications, additions and/or rearrangements within the spirit and/or scope of the underlying inventive concept will become apparent to those skilled in the art from this disclosure. Embodiments discussed herein can be implemented in suitable computer-executable instructions that may reside on a computer readable medium (e.g., a HD), hardware circuitry or the like, or any combination.

As discussed above, there are therefore a number of unmet desires when it comes to obtaining, analyzing, correlating, enhancing and presenting vehicle pricing data. In particular, it is desired to provide and utilize metrics that account for density of population and density of dealerships for various makes in the context of the vehicle marketplace in order to effectively utilize and present such data.

Attention is thus directed to the systems presented here, which provide for the determination of one or more normalization metrics that account for geography and population density or spatial behavioral patterns of consumers. These normalization metrics may be one or more quantifiers of the effect of spatial distribution of consumers or dealers holding other factors equal. These metrics may provide a normalized way of comparing and understanding spatial behavioral patterns of car buyers and its links to competitiveness of car dealers.

These metrics may be utilized in the computation of one or more performance metrics such as close rate or the like to account for these spatial differences when performing the determination of these performance metrics. Moreover, the normalization metrics may be utilized to assign a dealer or geographic area to a particular zone or zone type (e.g., relative to one or more other dealers).

Figure 1:
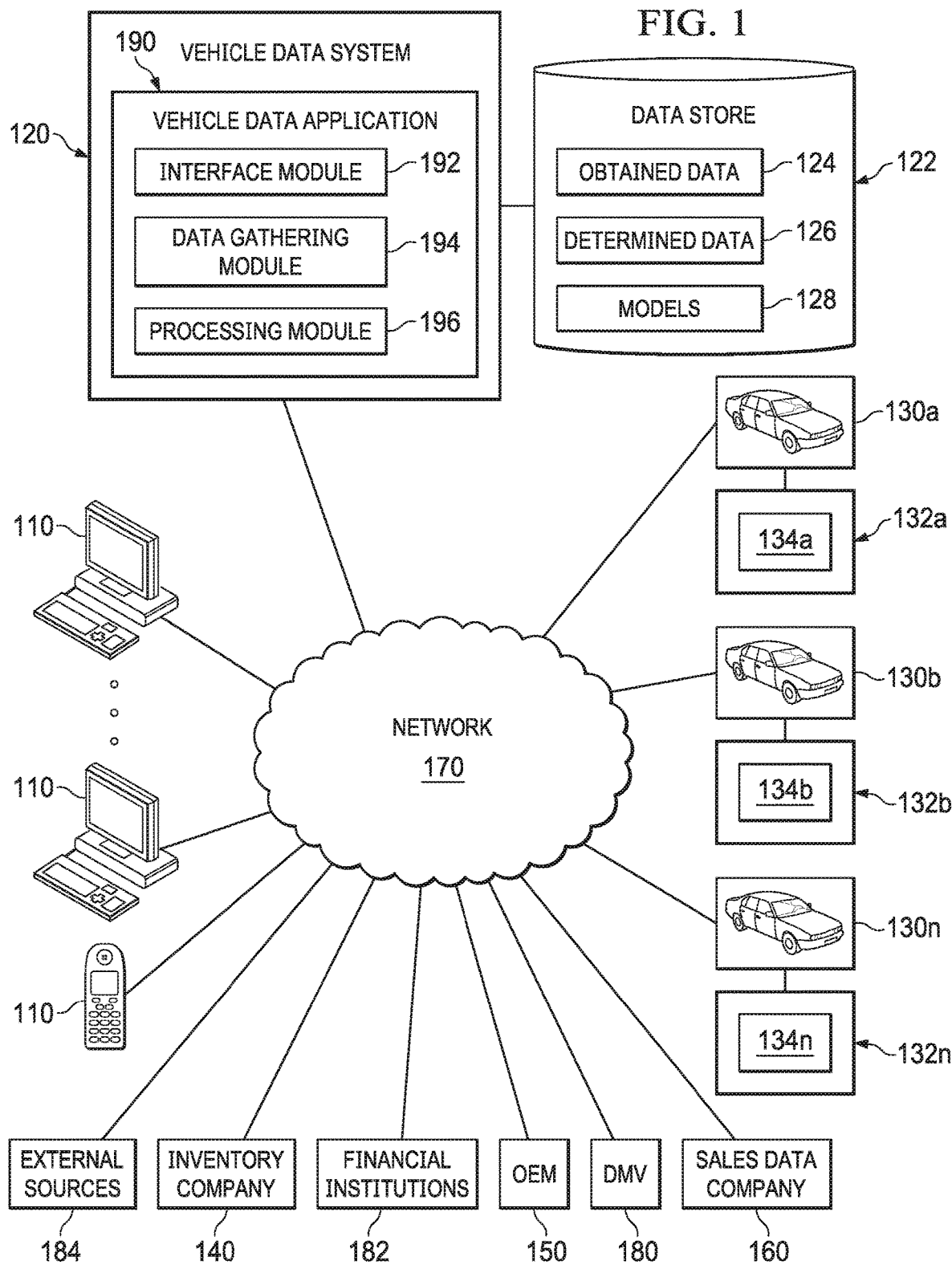
FIG. 1 is a block diagram of one embodiment of a topology of a distributed computer network, including a vehicle data system.

Embodiments of the systems and methods of the present invention may be better explained with reference to FIG. 1 which depicts one embodiment of a topology which may be used to implement embodiments of the systems and methods of the present invention. Additional example topologies can be found in U.S. Pat. No. 9,129,325, issued Sep. 8, 2015, entitled "SYSTEM AND METHOD FOR AGGREGATION, ANALYSIS, PRESENTATION AND MONETIZATION OF PRICING DATA FOR VEHICLES AND OTHER COMMODITIES,", U.S. Pat. No. 7,945,483, issued May 17, 2011, entitled "SYSTEM AND METHOD FOR SALES GENERATION IN CONJUNCTION WITH A VEHICLE DATA SYSTEM," and U.S. patent application Ser. No. 15/471,805, filed Mar. 28, 2017, entitled "VEHICLE DATA SYSTEM FOR RULES BASED DETERMINATION AND REAL-TIME DISTRIBUTION OF ENHANCED VEHICLE DATA IN AN ONLINE NETWORKED ENVIRONMENT", each of which is hereby incorporated by reference in its entirety for all purposes.

Topology 100 comprises a set of entities including vehicle data system 120 (also referred to herein as the TrueCar system) which is coupled through network 170 to computing devices 110 (e.g. computer systems, personal data assistants, kiosks, dedicated terminals, mobile telephones, smart phones, etc.), and one or more computing devices at inventory companies 140, original equipment manufacturers (OEM) 150, sales data companies 160, financial institutions 182, external information sources 184, departments of motor vehicles (DMV) 180 and one or more associated point of sale locations, in this embodiment, computer systems 132 in car dealers 130. Network 170 may be for example, a wireless or wireline communication network such as the Internet or wide area network (WAN), publicly switched telephone network (PTSN) or any other type of electronic or non-electronic communication link such as mail, courier services or the like.

Vehicle data system 120 may comprise one or more computer systems with central processing units executing instructions embodied on one or more computer readable media where the instructions are configured to perform at least some of the functionality associated with embodiments of the present invention. These applications may include a vehicle data application 190 comprising one or more applications (instructions embodied on a computer readable media) configured to implement an interface module 192, data gathering module 194 and processing module 196 utilized by the vehicle data system 120. Furthermore, vehicle data system 120 may include data store 122 operable to store obtained data 124, data 126 determined during operation, models 128 which may comprise a set of dealer cost model or price ratio models, or any other type of data associated with embodiments of the present invention or determined during the implementation of those embodiments. Data store 122 may include a variety of user data, including user behavioral data, vehicle data, dealer data, manufacturer data and other data.

Vehicle data system 120 may provide a wide degree of functionality including utilizing one or more interfaces 192 configured to for example, receive and respond to queries from users at computing devices 110 or dealer computer 132; interface with inventory companies 140, manufacturers 150, sales data companies 160, financial institutions 170, DMVs 180 or dealers 130 to obtain data; or provide data obtained, or determined, by vehicle data system 120 to any of inventory companies 140, manufacturers 150, sales data companies 160, financial institutions 182, DMVs 180, external data sources 184 or dealers 130. It will be understood that the particular interface 192 utilized in a given context may depend on the functionality being implemented by vehicle data system 120, the type of network 170 utilized to communicate with any particular entity, the type of data to be obtained or presented, the time interval at which data is obtained from the entities, the types of systems utilized at the various entities, etc. Thus, these interfaces may include, for example web pages, web services, a data entry or database application to which data can be entered or otherwise accessed by an operator, or almost any other type of interface which it is desired to utilize in a particular context.

In general, then, using these interfaces 192 vehicle data system 120 may obtain data from a variety of sources, including one or more of inventory companies 140, manufacturers 150, sales data companies 160, financial institutions 182, DMVs 180, external data sources 184 or computer systems 132 at dealers 130 and store such data in data store 122. This data may be then grouped, analyzed or otherwise processed by vehicle data system 120 to determine desired data 126 or models 128 which are also stored in data store 122.

A user at computing device 110 may access the vehicle data system 120 through the provided interfaces 192 and specify certain parameters, such as a desired vehicle configuration or incentive data the user wishes to apply, if any. The vehicle data system 120 can select a particular set of data in the data store 122 based on the user specified parameters, process the set of data using processing module 196 and models 128, generate interfaces using interface module 192 using the selected data set and data determined from the processing, and present these interfaces to the user at the user's computing device 110 or through dealer computers 132. More specifically, in one embodiment interfaces 192 may visually present the selected data set to the user in a highly intuitive and useful manner.

Turning to the various other entities in topology 100, dealer 130 (e.g., dealers 130a, 130b . . . 130n) may be a retail outlet for vehicles manufactured by one or more of OEMs 150. To track or otherwise manage sales, finance, parts, service, inventory and back office administration needs dealers 130 may employ a dealer management system (DMS) 132 (e.g., 132a, 132b . . . 132n). Since many DMS 132 are Active Server Pages (ASP) based, transaction data 134 (e.g., 134a, 134b . . . 134n) may be obtained directly from the DMS 132 with a "key" (for example, an ID and Password with set permissions within the DMS system 132) that enables data to be retrieved from the DMS system 132. Many dealers 130 may also have one or more web sites which may be accessed over network 170, where pricing data pertinent to the dealer 130 may be presented on those web sites, including any pre-determined, or upfront, pricing. This price is typically the "no haggle" (price with no negotiation) price and may be deemed a "fair" price by vehicle data system 120.

Additionally, a dealer's current inventory may be obtained from a DMS 132 and associated with that dealer's information in data store 122. A dealer 130 may also provide one or more upfront prices to operators of vehicle data system 120. Each of these upfront prices may be associated with a vehicle configuration such that a list of vehicle configurations and associated upfront prices may be associated with a dealer in data store 122. This upfront price may, in one embodiment, comprise an offset from an inventory price for the vehicle configuration. It will be noted that an upfront price may be provided at almost any level of granularity desired. For example, a single upfront price may correspond to all vehicles of a particular make sold by the dealer, to all vehicles of a particular make and model sold by the dealer, to all vehicles of a particular make, model and trim sold by the dealer, etc.

Inventory companies 140 may be one or more inventory polling companies, inventory management companies or listing aggregators which may obtain and store inventory data from one or more of dealers 130 (for example, obtaining such data from DMS 132). Inventory polling companies are typically commissioned by the dealer to pull data from a DMS 132 and format the data for use on websites and by other systems. Inventory management companies manually upload inventory information (photos, description, specifications) on behalf of the dealer. Listing aggregators get their data by "scraping" or "spidering" websites that display inventory content and receiving direct feeds from listing websites (for example, Autotrader, FordVehicles.com).

DMVs 180 may collectively include any type of government entity to which a user provides data related to a vehicle. For example, when a user purchases a vehicle it must be registered with the state (for example, DMV, Secretary of State, etc.) for tax and titling purposes. This data typically includes vehicle attributes (for example, model year, make, model, mileage, etc.) and sales transaction prices for tax purposes. Thus, data obtained 124 from the DMVs 180 may include vehicle registrations from dealers 130, including the dealer (or dealer location) from which a vehicle was purchased, the zip code or address of the consumer who purchased the vehicle, the date of the sales transaction, etc.

Financial institution 182 may be any entity such as a bank, savings and loan, credit union, etc. that provides any type of financial services to a participant involved in the purchase of a vehicle. For example, when a buyer purchases a vehicle they may utilize a loan from a financial institution, where the loan process usually requires two steps: applying for the loan and contracting the loan. These two steps may utilize vehicle and consumer information in order for the financial institution to properly assess and understand the risk profile of the loan. Typically, both the loan application and loan agreement include proposed and actual sales prices of the vehicle.

Sales data companies 160 may include any entities that collect any type of vehicle sales data. For example, syndicated sales data companies aggregate new and used sales transaction data from the DMS 132 systems of particular dealers 130. These companies may have formal agreements with dealers 130 that enable them to retrieve data from the dealer 130 in order to syndicate the collected data for the purposes of internal analysis or external purchase of the data by other data companies, dealers, and OEMs.

Manufacturers 150 are those entities which actually build the vehicles sold by dealers 130. In order to guide the pricing of their vehicles, the manufacturers 150 may provide an Invoice price and a Manufacturer's Suggested Retail Price (MSRP) for both vehicles and options for those vehicles—to be used as general guidelines for the dealer's cost and price. These fixed prices are set by the manufacturer and may vary slightly by geographic region.

External information sources 184 may comprise any number of other various source, online or otherwise, which may provide other types of desired data, for example data regarding vehicles, pricing, demographics, economic conditions, markets, locale (s), consumers, etc.

It should be noted here that not all of the various entities depicted in topology 100 are necessary, or even desired, in embodiments of the present invention, and that certain of the functionality described with respect to the entities depicted in topology 100 may be combined into a single entity or eliminated altogether.

Additionally, in some embodiments other data sources not shown in topology 100 may be utilized. Topology 100 is therefore exemplary only and should in no way be taken as imposing any limitations on embodiments of the present invention.

At certain intervals, vehicle data system 120 may obtain by gathering (for example, using an interface of interface module 192 to receive or request) data from one or more of inventory companies 140, manufacturers 150, sales data companies 160, financial institutions 182, DMVs 180, external data sources 184 or dealers 130. This data may include sales or other historical transaction data for a variety of vehicle configurations, inventory data, registration data, finance data, vehicle data, incentive data and other data.

It should be noted that differing types of data may be obtained at different time intervals, where the time interval utilized in any particular embodiment for a certain type of data may be based, at least in part, on how often that data is updated at the source, how often new data of that type is generated, an agreement between the source of the data and the providers of the vehicle data system 120 or a wide variety of other factors. The data collected from these various data sources distributed across the network may thus be used to enhance or augment previously stored data records, allowing the use of centralized data store or the like, even in cases where the data must be collected at different time intervals from various data sources distributed across a networked computing environment.

Once such data is obtained and stored in data store 122, it may be analyzed and otherwise processed to yield data sets corresponding to particular vehicle configurations (which may include, for example, include vehicle make, model, power train, options, etc.) and geographical areas (national, regional, local, city, state, zip code, county, designated market area (DMA), or any other desired geographical area). It will be understood that although certain geographic areas are used in association with some of the following descriptions in association with particular embodiments (e.g., zip code) almost any desired geographic area may be utilized in other embodiments and the use of a particular geographic area in the description of certain embodiments should not be taken in any way as a limitation generally on other embodiments.

In one embodiment, the obtained data 124 or the determined data 126 may include a zip code or address (or other indicator of geographic location) for each of a set of vehicle dealers 130. These vehicle dealers may be all the dealers in a geographic area (such as nationally), or dealers 130 associated with a particular network of dealers (e.g., True-Car dealer network) or both. Moreover, sales or transaction data associated with vehicle sales at the set of vehicle dealers 130 may also be stored in the obtained data 124. This sales or transaction data may include data on a set of vehicle sales, each vehicle sale corresponding to a vehicle sale of a vehicle make and model occurring at a dealer and may be associated with, for example, a sales price, a buyer's address or location, etc.

According to some embodiments, the obtained data 124 may include historical data which may be obtained from an aggregator or provider of industry data, such as Polk. In such embodiments, the raw historical data may be provided in a tabular format, a portion of which may include data as shown below, where each row represents one transaction.

| Registration Year Month | Make | Customer Zip code | Dealer Zip code | Dealer Address |
|---|---|---|---|---|
| 201611 | Toyota | 90024 | 90401 | 120 Broadway 90024 Santa Monica CA |
| ... | ... | ... | ... | ... |

Additionally, for every zip code (or other geographic indicator) the centroid (e.g., latitude and longitude) of the zip code may be stored (e.g., in obtained data 124 or determined data 126). In particular, in one embodiment this data may be stored in a lookup table such that the distance from every dealer to any other dealer may be determined or the distance from any dealer to a zip code (e.g., the centroid of a zip code) may be determined.

Using the obtained data 124 or the determined data 126 one or more competition zone indices may be calculated. In one embodiment, a competition zone index is an indicator of competitiveness for dealers defined at zip code level and with respect to the surrounding competition. A competition zone index or value may take at least two formulations, namely a Dealer Competition Zone (DCZ) index (sometimes just referred to as a DCZ) and a Customer Competition Zone (CCZ) index (sometimes just referred to as a CCZ). The former may quantify how competitive a single dealer is in some specific zip code, while the latter may quantify a set of dealers with respect to another set of dealers (e.g., who may or may not be a participant in a dealer network such as the TrueCar network). These DCZ or CCZ metrics may be stored in the determined data 126. For example, for a dealer, that dealer may be associated with a DCZ value for each of a set of zip codes for each of a set of makes associated with the dealer (e.g., for each make, an associated DCZ value for the dealer in each zip code).

For either of these two types of competition zones indices, the index may be calculated for a specific make (e.g. a dealer who sells both Ford and Toyota vehicles may have separate index values for Ford different from Toyota) based on: 1) distances between zip codes and dealerships of a make, and 2) a set of typical distances traveled by customers of each zip code to buy cars of that make. These typical distances may serve as local normalization factors. They may be defined in different ways in particular embodiments. In one embodiment, the median distance as computed from historical transactions may be used. Mean distance may also be utilized, among other determinations of distance. If there are too few (or zero) sales or transaction records to compute mean and median, the value may be imputed or defined as a weighted average of the closest dealers to a zip code.

In one embodiment, a DCZ may be a non-dimensional real number determined for one or more dealers with respect to a zip code (e.g., in which a dealer or a potential consumer may reside) and a make. In particular, in one embodiment, a DCZ may be determined for each dealer (e.g., each dealer within a network) and each zip code. Specifically, in one embodiment, for a dealer d selling make m and a ZIP Code z, DCZ is defined by $$DCZ(z,d,m) = \frac{distance_{z,d} - distance_{z, closest\ dealer\ to\ z\ excluding\ d}}{distance\ traveled\ from\ z\ to\ buy\ m} \quad (EQ1)$$

The denominator allows normalization across different geographical regions. This distance may, for example, be a median or mean distance driven. In an urban area the median distance will be significantly smaller than in a rural area. In zip codes with a negative DCZ, the dealer for whom the metric is being calculated may be the closest; as the DCZ increases the dealer may be farther to the consumer compared to other dealers.

The DCZ may be utilized to classify the zip code of interest into a zone for the dealer, as will be discussed, or may be used in one or more other calculations or determinations. For example, the DCZ values for one or more dealers can be used to define dealers' areas of influence (e.g., associated with certain zip codes). In particular, the DCZ for a dealer may be used to define or classify zip codes into different zones of comparative advantage or disadvantage. These zone labels or classifications may be associated with the dealer, the make and the zip code in determined data 126.

In one particular embodiment, the DCZ or CCZ values for a dealer for a make and zip code may be used to define one or more zone labels for the dealer for that make and zip code. For example, these zones may include one or more 'backyard' zones for the dealer where the dealer has a geographical advantage compared to the competition; one or more 'competition' zones (also referred to as 'competitive' zones) for the dealer where the dealer is at a comparable distance with other dealers; and one or more 'conquest' zones for the dealer where the dealer is at a disadvantage in terms of distance. Different, fewer or additional zones may also be utilized based on the DCZ or CCZ values for a dealer for a make and a zip code. For example, instead of a single 'conquest' zone for use with geographic areas (e.g., zip code) where the dealer is at a disadvantage in terms of distance; 'conquest far' and 'conquest near' zones may be utilized, both designating that the dealer is at a disadvantage, but denoting a comparative advantage or disadvantage between the 'conquest near' and 'conquest far' zones.

These types of zones (e.g., zone labels) may be assigned to each zip code in association with the dealer based on that dealer's DCZ or CCZ determined for that zip code and make. Thus, for each zip code and make sold by the dealer, the zip code may be assigned a zone label (e.g., backyard, competitive, conquest, conquest far, conquest near or the like) for that dealer based on the value of the DCZ or CCZ determined for that dealer for that make and zip code. These zones allow dealers to better understand their market and allow better evaluation of dealer performance.

At some point then, a user at a computing device 110 may access vehicle data system 120 using one or more interfaces provided by interface module 192, such as a set of web pages provided by vehicle data system 120. This user may be associated with a dealer 130 and may thus access a dealer interface provided by the vehicle data system 120. The dealer interface may allow a user affiliated, or otherwise associated with, the dealer 130 to access or otherwise request data stored by the vehicle data system 120 associated with that dealer (or in certain cases other dealers), vehicle data, data associated with that dealer's network, or other data of interest to a dealer.

As a user interacts with vehicle data system 120 via the interface (e.g., the dealer interface), vehicle data system 120 may collect or determine a set of features or data (terms used here interchangeably) associated with the dealer. These features may be determined based on, for example, an identification of the dealer based upon a user authentication or other data. The observable features may be determined in the context of a single session or across sessions and may include information related to that dealer, including the dealer's DCZ or CCZ values for one or more zip codes and makes, the zone label assigned to a dealer for one or more zip codes or makes, or other data obtained or determined that may be of interest to a user associated with the dealer 130.

This data may include data determined in real-time as the user is accessing the vehicle data system 120 through a web based interface or may be one or more components previously determined and stored by the vehicle data system 120.

These features, or some portion of the determined features, associated with the dealer can be presented to the user in a visual display in real-time, or may be used to determine, in real-time data to be presented to the user in a visual display. For example, a graphical display in an interface presented to a user may present the zone labels for a set of zip codes in the vicinity of the dealer. Such a presentation may include, for example, a depiction of a zip code map and a color coded presentation of the zone labels along with graphical depiction of the various dealers in the geographic region. Graphical depictions may also be used in the interface to depict other features for the dealer (or other dealers), such as color coded depictions of close rate or relative performance, etc. Features associated with the dealer, including textual display of data associated with the determination of the DCZ values, CCZ values, zone labels or other data may also be presented in the interface. These and other aspects of various embodiments are discussed further below.

Figure 2A:
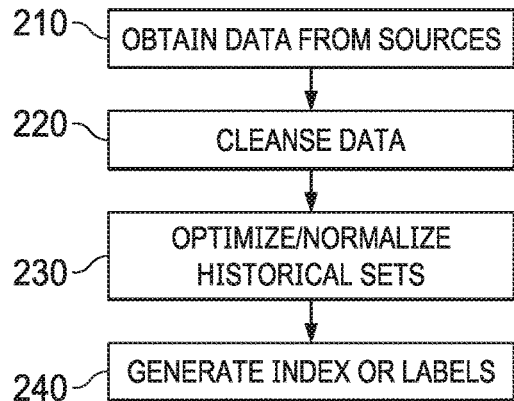
FIGS. 2A and 2B depict one embodiment of a method for determining, utilizing and presenting index values or zone labels.
Figure 2B:
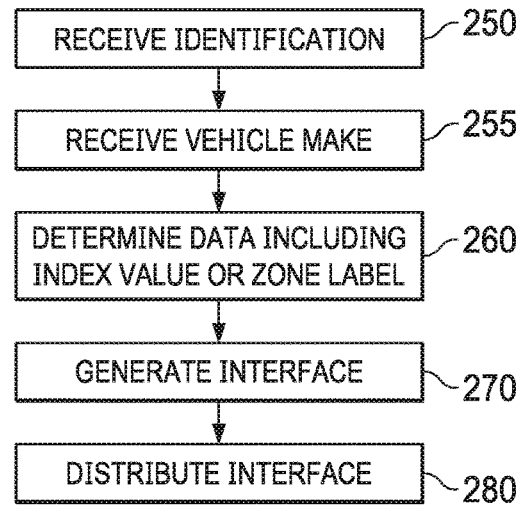

Turning now to FIGS. 2A and 2B, aspects of the operation of a vehicle data system are depicted. Referring first to the embodiment of FIG. 2A, at step 210 data can be obtained from one or more of the data sources (e.g., inventory companies 140, manufacturers 150, sales data companies 160, financial institutions 182, DMVs 180, external data sources 184, used car data sources 186, dealers 130, etc.) coupled to the vehicle data system 120 and the obtained data can be stored in the associated data store 122. In particular, obtaining data may comprise gathering the data by requesting or receiving the data from a data source. It will be noted with respect to obtaining data from data sources that different data may be obtained from different data sources at different intervals, and that previously obtained data may be archived before new data of the same type is obtained and stored in data store 122. The data collected from these various data sources distributed across the network may thus be used to enhance or augment previously stored data records, allowing the use of centralized data store or the like, even in cases where the data must be collected at different time intervals from various data sources distributed across a networked computing environment.

In certain cases, some of the operators of these data sources may not desire to provide certain types of data, especially when such data includes personal information or certain vehicle information (VIN numbers, license plate numbers, etc.). However, in order to correlate data corresponding to the same person, vehicle, etc. obtained from different data sources and enhance certain data records, it may be desirable to have such information. To address this problem, operators of these data sources may be provided a particular hashing algorithm and key by operators of vehicle data system 120 such that sensitive information in data provided to vehicle data system 120 may be submitted and stored in data store 122 as a hashed value. Because each of the data sources utilizes the same hashing algorithm to hash certain provided data, identical data values will have identical hash values, facilitating matching or correlation between data obtained from different (or the same) data source(s). Thus, the data source operators' concerns can be addressed while simultaneously avoiding adversely impacting the operation of vehicle data system 120.

Once data is obtained and stored in data store 122, the obtained data may be cleansed at step 220. The cleansing of this data may include evaluation of the data to determine if it conforms to known values, falls within certain ranges or is duplicative. When such data is found, it may be removed from the data store 122, the values which are incorrect or fall outside a threshold may be replaced with one or more values (which may be known specifically or be default values), or some other action entirely may be taken.

At step 230, the cleansed data may be optimized, and where appropriate, normalized and used to form sample sets of data. Normalization may include converting historical sales data which is expressed in dollars or other currencies into price ratios comprising the sale price divided by the MSRP, upfront price (UFP) or other reference value. In this way, historical sales data may be normalized. Normalization may also include performing adjustments (e.g., applying one or more adjustment factors) to account for inherent differences in how vehicle prices are reported. The application of such adjustment factors may prevent the differing (or changing) percentages of data coming from each source from impacting the accuracy of results.

Optimization may include grouping data into data sets according to geography (for example, national, regional, local, state, county, zip code, DMA, some other definition of a geographic area, such as within 500 miles of a location, etc.) and optimizing these geographic data sets for a particular vehicle configuration. In the case of used vehicles, the optimization may further comprise grouping data into sets according to mileage, condition or other parameters of particular interest to buyers and sellers of used vehicles. This optimization process may result in one or more data sets corresponding to a particular vehicle or group or type of vehicles, a set of attributes of a vehicle and an associated geography.

In one embodiment, the obtained data or the determined data may include a zip code or address (or other indicator of geographic location) for each of a set of vehicle dealers 130. These vehicle dealers may be all the dealers in a geographic area (such as nationally), or dealers 130 associated with a particular network of dealers (e.g., TrueCar dealer network) or both. Moreover, sales or transaction data associated with vehicle sales at the set of vehicle dealers 130 may also be stored in the obtained data. This sales or transaction data may include data on a set of vehicle sales, each vehicle sale corresponding to a vehicle sale of a vehicle make and model occurring at a dealer and may be associated with, for example, a sales price, a buyer's address or location, etc.

Using the data sets resulting from the optimization process, one or more competition zone indices may be calculated. As discussed above, a competition zone index is an indicator of competitiveness for dealers defined at zip code level and with respect to the surrounding competition. A competition zone index or value may take at least two formulations, namely a DCZ index and a CCZ index. The former may quantify how competitive a single dealer is in some specific zip code, while the latter may quantify a set of dealers with respect to another set of dealers (e.g., who may or may not be a participant in a dealer network such as the TrueCar network). These DCZ or CCZ metrics may be stored in the data store. For example, for a dealer, that dealer may be associated with a DCZ or CCZ value for each of a set of zip codes for each of a set of makes associated with the dealer (e.g., for each make, an associated DCZ or CCZ value for the dealer in each zip code).

Additionally, in one particular embodiment, the DCZ or CCZ values for a dealer for a make and zip code may be used to define one or zone labels for the dealer for that make and zip code. For example, these zones may include one or more 'backyard' zones for the dealer where the dealer has a geographical advantage compared to the competition; one or more 'competitive' zones for the dealer where the dealer is at a comparable distance with other dealers; and one or more 'conquest' zones or 'conquest near' and 'conquest far' zones for the dealer where the dealer is at a disadvantage in terms of distance. Different, fewer or additional zones may also be utilized based on the DCZ or CCZ values for a dealer for a make and a zip code.

Moving on to the portion of the embodiment depicted in FIG. 2B, at step 250 the vehicle data system 120 may receive an identification of a dealer of interest or zip code of interest through a provided interface 192. In one embodiment, for example, a user at a web page provided by vehicle data system 120 may select a zip code or provide a dealer identification using one or more menus or may navigate through a set of web pages to provide the specific vehicle configuration. At step 255, the user may also specify a vehicle make of interest, and in some embodiments, a make of interest or a date range of interest.

Geographic or sales data may then be determined by the vehicle data system 120 at step 260. This data may include transaction data or geographic data for the dealer of interest or other dealers associated with the make of interest or provided zip code or other zip codes or makes. The data may also include the determination of one or more of a CCZ index value, a DCZ index value or a zone label for one or more zip codes of interest. For example, a number of zip codes within a certain distance of the zip code of the dealer.

An interface for presentation of any determined index values or zone labels for one or more zip codes or makes may then be generated at step 270. These interfaces may comprise a visual presentation of such data using, for example, coded maps, line charts, bar charts, histograms, Gaussian curves with indicators of certain price points, graphs with trend lines indicating historical trends or price forecasts, or any other desired format for the visual presentation of data. In particular, in one embodiment, a graphical display in an interface presented to a user may present zone labels for a set of zip codes in the vicinity of the dealer. Such a presentation may include, for example, a depiction of a zip code map and a color coded presentation of the zone labels along with graphical depiction of the various dealers in the geographic region. Graphical depictions may also be used in the interface to depict other features for the dealer (or other dealers), such as color coded depictions of close rate or relative performance, etc. Features associated with the dealer, including textual display of data associated with the determination of the DCZ values, CCZ values, zone labels or other data may also be presented in the interface.

The interfaces may be distributed through a variety of channels at step 280. The channels may comprise a consumer-facing network based application (for example, a set of web pages provided by vehicle data system 120 which a consumer may access over a network at a computing device such as a computer or mobile phone and which are tailored to the desires of, or use by, consumers); a dealer facing network based application (a set of web pages provided by the vehicle data system 120 which are tailored to the desires of, or use by, dealers); text or multimedia messaging services; widgets for use in web sites or in other application settings, such as mobile phone applications; voice applications accessible through a phone; or almost any other channel desired. It should be noted that the channels described here, and elsewhere, within this disclosure in conjunction with the distribution of data may also be used to receive data (for example, a user specified vehicle configuration or the like), and that the same or some combination of different channels may be used both to receive data and distribute data.

As may be apparent from a review of the above discussion, embodiments of vehicle data system 120 may entail a number of processes occurring substantially simultaneously or at different intervals and that many computing devices 110 may desire to access vehicle data system 120 at any given point. Accordingly, in some embodiments, vehicle data system 120 may be implemented utilizing an architecture or infrastructure that facilitates cost reduction, performance, fault tolerance, efficiency and scalability of the vehicle data system 120.

Figure 3:
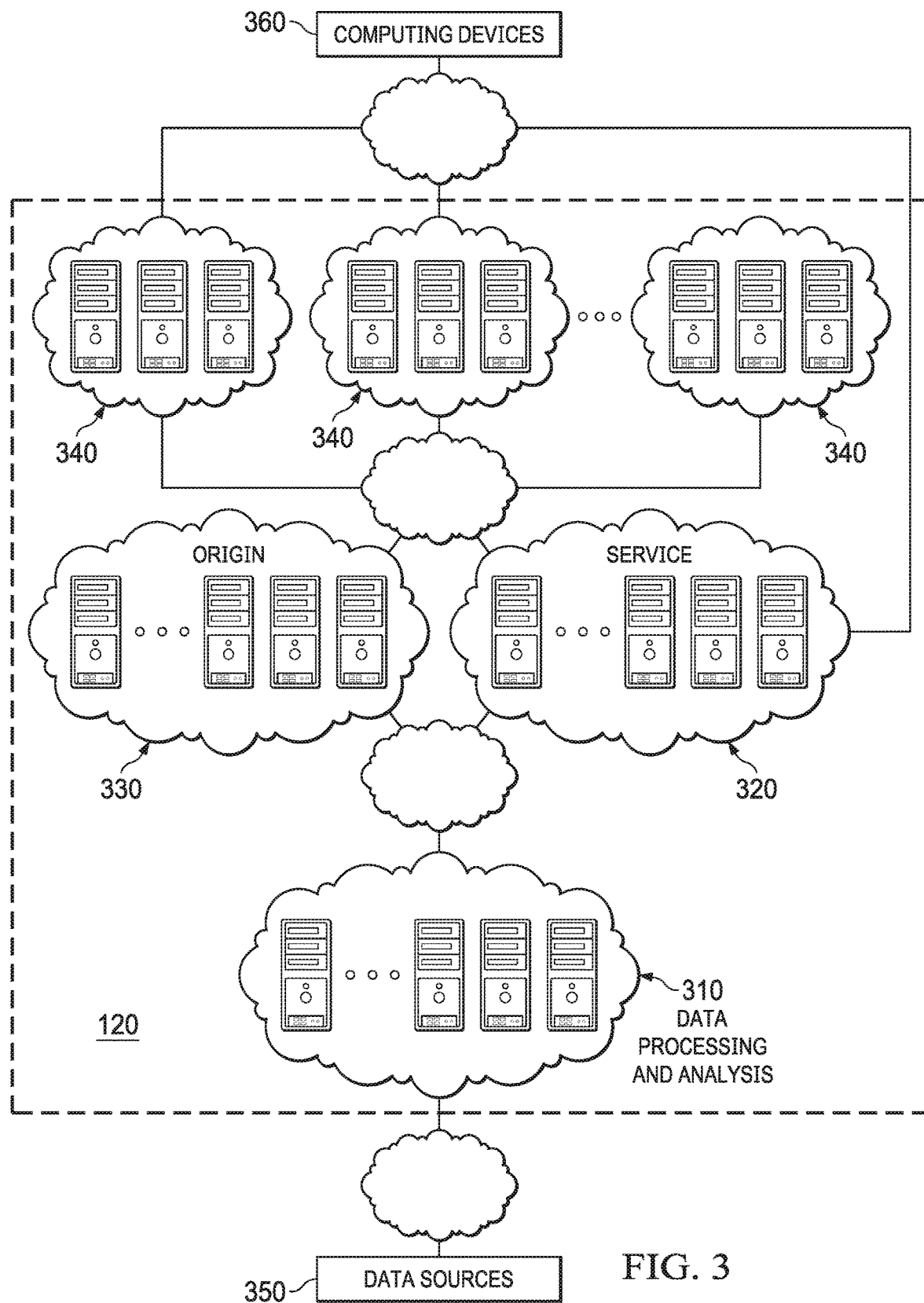
FIG. 3 depicts one embodiment of an architecture for a vehicle data system.

One embodiment of such an architecture is depicted in FIG. 3. Specifically, one embodiment of vehicle data system 120 may be operable to provide a network based interface including a set of web pages accessible over the network, including web pages where a user can specify a desired vehicle configuration and receive pricing data corresponding to the specified vehicle configuration. Such a vehicle data system 120 may be implemented utilizing a content delivery network (CDN) comprising data processing and analysis servers 310, services servers 320, origin servers 330 and server farms 340 distributed across one or more networks, where servers in each of data processing and analysis servers 310, services servers 320, origin servers 330 and server farms 340 may be deployed in multiple locations using multiple network backbones or networks where the servers may be load balanced.

The vehicle data system may include a back-end comprising data processing and analysis servers 320 which may interact with one or more data sources 350 (examples of which are discussed above) to obtain data from these data sources 350 at certain time intervals (for example, daily, weekly, hourly, at some ad-hoc variable interval, etc.) and process this obtained data as discussed both above in more detail later herein. This processing includes, for example, the cleansing of the obtained data, determining and optimizing sample sets, the generation of models, etc.

The back-end may also include origin servers 330 which may populate a web cache at each of server farms 340 with content for the provisioning of the web pages of the interface to users at computing devices 360 (examples of which are discussed above). Server farms 340 may provide the set of web pages to users at computing devices 110 using web caches at each server farm 340. More specifically, users at computing devices 360 connect over the network to a particular server farm 340 such that the user can interact with the web pages to submit and receive data through the provided web pages. In association with a user's use of these web pages, user requests for content may be algorithmically directed to a particular server farm 340. For example, when optimizing for performance locations for serving content to the user may be selected by choosing locations that are the fewest hops, the fewest number of network seconds away from the requesting client or the highest availability in terms of server performance (both current and historical), so as to optimize delivery across the network.

Certain of the web pages or other interfaces provided by vehicle data system 120 may allow a user to request services, interfaces or data which cannot be provided by server farms 340, such as requests for data which is not stored in the web cache of server farms 340 or analytics not implemented in server farms 340. User requests which cannot be serviced by server farm 340 may be routed to one of service servers 330. These requests may include requests for complex services which may be implemented by service servers 330, in some cases utilizing the data obtained or determined using data processing and analysis servers 310.

Figure 4:
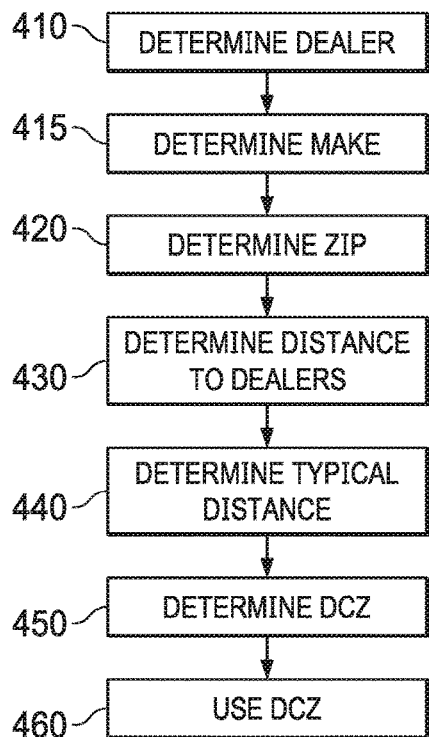
FIG. 4 is a flow diagram of one embodiment of a method for determining DCZ.

Turning now to FIG. 4, a flow diagram for one embodiment of a method of determining and utilizing a DCZ is depicted. Such a method may be, for example, employed by a vehicle data system in determining features associated with a dealer. In particular, an embodiment of such a method may be utilized when determining DCZ values for a set of dealers for a set of makes for a set of geographical locations (e.g., zip codes).

Initially, at step 410 a dealer of interest may be determined. This dealer may be provided through an input from an interface offered by a vehicle data system to a consumer or dealer, or may be part of a regularly executed determination of DCZs for one, a number of, or all of a set of dealers (e.g., all dealers in a geographic area or within a dealer network, etc.).

A make of interest may also be determined at step 415. The dealer of interest is associated with a make for which it is a dealer. This make may be utilized as the make of interest. If the dealer is a dealer for multiple makes, multiple DCZs for the dealer may be determined for each make which the dealer carries, a subset of these makes, or only for the particular make of interest.

At step 420, a zip code of interest may be determined. As the purpose of determining DCZ for a dealer may be to determine the competitive zones for a dealer, a DCZ may be determined for a dealer with respect to each zip code in a set of zip codes. In one embodiment, the set of zip code may be all the zip code in the country or a subset of zip code within a certain distance of the zip code in which the dealer of interest resides. Thus, to determine a zip code of interest, a zip code may be selected from the set of zip codes.

At step 430 the distance from the zip code of interest (e.g., as determined at step 420) to each of the available dealers (including the dealer of interest) for the make of interest (e.g., as determined at step 415) associated with the dealer of interest is determined. Again, the number of available dealers for which the distance is determined may be all the dealers in a geographic region (e.g., nationally, state wide, confined to some distance of the zip code of interest, etc.). This distance data may be, for example, have been previously obtained from map data or the like and stored at a vehicle data system.

At step 440 then, a typical distance for the zip code of interest may be determined. This typical distance may be a measure of the typical distance a consumer in the zip code of interest would travel to purchase a vehicle of the make of interest (e.g., the make associated with the dealer of interest as determined at step 415). This typical distance may be determined from historical transaction records for consumers living in the zip code of interest as determined from records of the DMV, dealers or other data sources. In some embodiments, the historical transaction data used to make a determination for the typical distance may be constrained by time such that only historical transaction data from within a certain time frame (e.g., two years) may be utilized.

Using this historical transaction data, a vector of distances for sales at each of the available dealers (e.g., for which a distance was determined in step 430) may be determined. The vector may include a set of distances, where each distance in the vector is a distance traveled by a consumer in the zip code of interest to purchase a vehicle of the make of interest. As discussed, a median distance of the vector of distances may be used as the typical distance. Mean distance of the vector of distances may also be used as the typical distance. Other determinations of the typical distance may be utilized in other embodiments and are fully contemplated herein.

In one embodiment, a threshold number of vehicle sales may be utilized. This threshold may be 10 sales, 50 sales, 100 sales or some other threshold. If there are too few records of sales (e.g., less than the threshold number of vehicle sales) to compute a typical distance (e.g., mean or median), the typical distance can be determined as a weighted average of the distance of a number of closest dealers to a zip code. The number of closest dealer may be for example a number (e.g., 5, 10, 50, 100, etc.) of dealers closest to the zip code (e.g., the centroid of the zip code), or all dealers within a certain distance (e.g., 5 miles, 10 miles, 50 miles, etc.) of the zip code of interest.

At step 450 then, the DCZ for the dealer of interest, make of interest and the zip code of interest can be determined according to EQ1 above by using the distance from the zip code of interest to the dealer of interest, the distance from the zip code of interest to the closest available dealer (excluding the dealer of interest), and the typical distance.

At step 460, the DCZ value may be used in a variety of contexts to account for the competitiveness of that dealer with respect to the specific geography (e.g., zip code of interest). The use of the DCZ may include the classification or qualification or quantization of new or previously determined data based on the DCZ. For example, in one embodiment, the determined DCZ value for the zip code of interest for the dealer of interest and make of interest may be utilized to classify the zip code of interest into a zone (e.g., to assign a zone label to the zip code) associated with the dealer of interest and make of interest, as has been discussed, or may be used in one or more other calculations or determinations.

In particular, in one embodiment, there may be a set of rules defining the assignment of a zone label to a zip code. These rules may define one or more thresholds or ranges of DCZ values and associated zone labels, such that if the DCZ value determined for a dealer with respect to a particular zip code and make exceeds or falls below a threshold, or falls within the range specified by the rule, the zip code may be associated with that zone label for that dealer and make. The classifications of one or more zip codes (e.g., based on the DCZ value for those zip codes associated with the dealer) may be presented to a user (e.g., associated with a dealer). The interface can, for example, present the zone labels for a set of zip codes in the vicinity of the dealer. Such a presentation may include, for example, a depiction of a zip code map and a color coded presentation of the zone labels along with graphical depiction of the various dealers in the geographic region. In this manner, a user associated with a dealer may be presented with an interface specifically tailored for that dealer.

Figure 5:
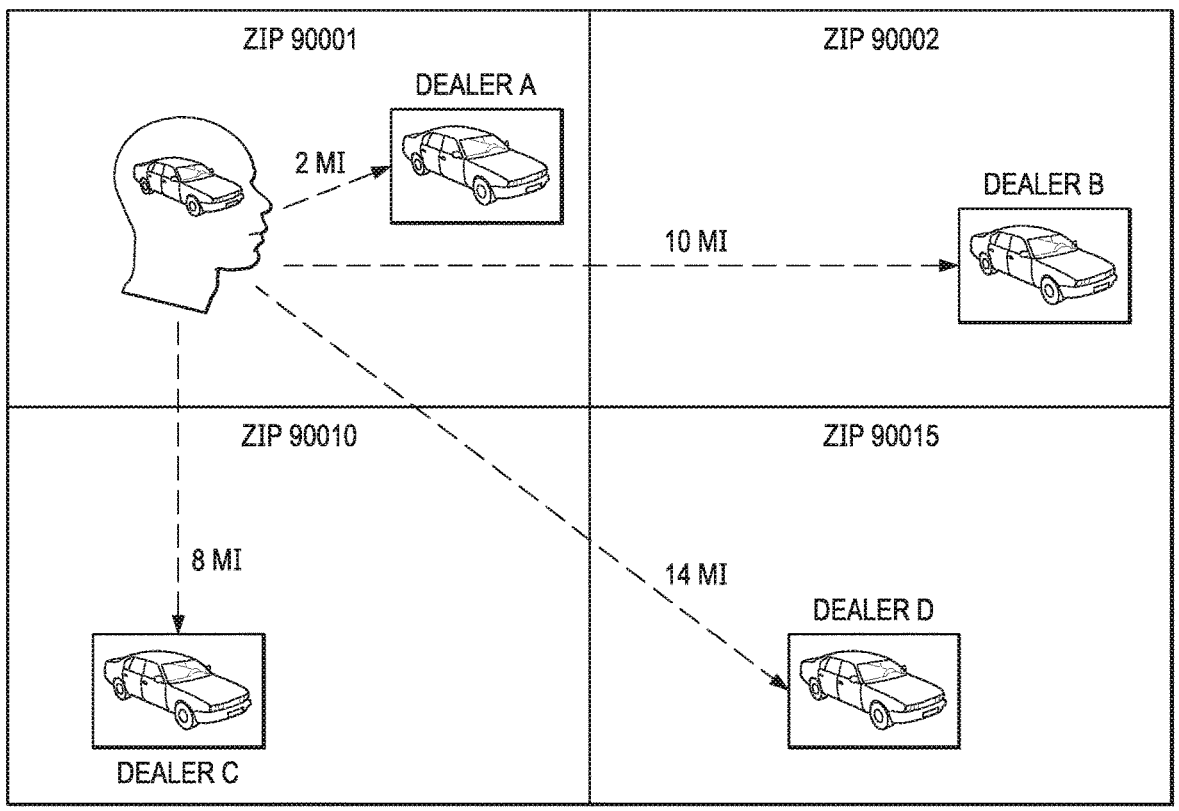
FIG. 5 is a block diagram of an example of geographic distribution for illustrating embodiments of methods of computing DCZ or CCZ.

FIG. 5 depicts a diagram useful in illustrating an example of a DCZ calculation for a particular dealer (e.g., a dealer of interest). Referring to FIG. 5 then, for purposes of the example assume the DCZ values for dealer A in zip code 90001 is being determined. First, all the distances from the zip code 90001 to the available dealers (in this example, dealers A, B, C, and D) for the same make for which dealer A is a dealer (e.g., a make of interest) can be determined. For purposes of this example, assume that dealers A, B, C and D are the only dealers of the make of interest within the geographic area of interest and the distances are those depicted in FIG. 3 (2 miles to dealer A, 10 miles to dealer B, 8 miles to dealer C and 14 miles to dealer D).

Then, the typical distance can be computed. For the sake of the example assume the following historical records for the make for consumers living in 90001: 10 sales at dealer A, 5 sales at dealer B, 3 sales at dealer C and no sales at dealer D. Then the vector of distances for the historical records (in miles) is [2, 2, 2, 2, 2, 2, 2, 2, 2, 2, 10, 10, 10, 10, 10, 8, 8, 8]. The median value is 2 miles and the average is 5.22 miles. In this example, the median of these distances will be chosen as typical distance.

Next, the closest dealer to 90001 once dealer A removed can be found: this yields dealer C. Using EQ 1:

$$DCZ(\text{dealer } A, 90001) = 2mi - 8mi/2mi = -3.0$$

Thus, according to his example the DCZ value for dealer A for the make of interest for zip code 990001 is −3.0.

Turning now to Customer Competition Zones, CCZs may be similar to DCZ but it is defined for competing sets of dealers (sets 1 and 2) and measures the competitiveness of one set of dealers (set 1) with respect to another (set 2) (e.g., with respect to one or more geographic regions). These two sets of dealers may be network dealers and non-network dealers or almost any two groups or sets of dealers desired to compare. Again, CCZ may be a non-dimensional real number.

In particular, in one embodiment, a CCZ may be determined for each make of interest and each zip code for a dealer set (relative to another dealer set). Specifically, in one embodiment, for make m and a zip code z, CCZ is defined by $$CCZ(\text{dealer } set1, zip, m) = \text{distance(closest dealer of } set1, zip) - \text{distance(closest dealer of } set2, zip)/\text{distance traveled from } z \text{ to buy } m \quad \text{(EQ2)}$$

The denominator is the same as in the DCZ. As before, in one embodiment, if CCZ is negative, the closest dealer to the customer is a dealer of set 1; when CCZ increases the dealers of set 1 are in a relatively weaker position compared to the dealers of set 2.

Figure 6:
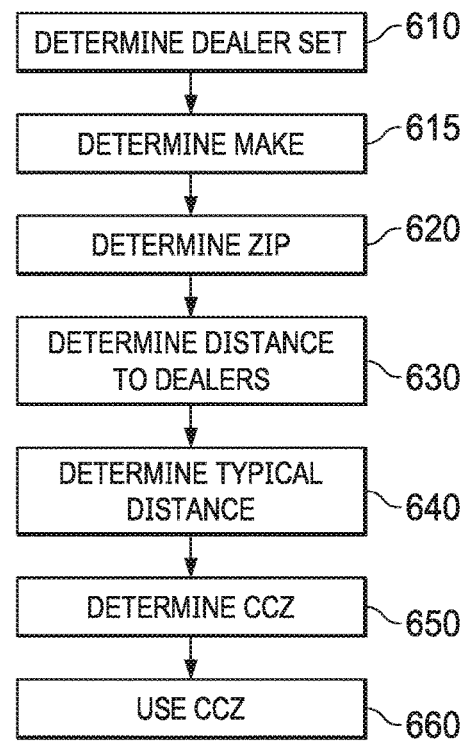
FIG. 6 is a flow diagram for one embodiment of a method for determining CCZ.

Turning now to FIG. 6 a flow diagram for one embodiment of a method of determining and utilizing a CCZ for a set of dealers with respect to a make is depicted. Such a method may be, for example, employed by a vehicle data system in determining features associated with a dealer or set of dealers. In particular, an embodiment of such a method may be utilized when determining CCZ values for a set of dealers for a set of makes for a set of geographical locations (e.g., zip codes).

Initially, at step 610 dealer sets of interest may be determined. These dealer sets may include, for example, a set of dealers that belong to a network of dealers (e.g., TrueCar dealers) and a set of non-network dealers. Other sets or divisions are imaginable and are contemplated herein. The sets of dealers may be defined or provided through an input from an interface offered by the vehicle data system to a consumer or dealer or may be part of a regularly executed determination of CCZ for a set of dealers (e.g., all dealers in a geographic area or within a dealer network, etc.).

A make of interest may also be determined at step 615. The dealer of the first set may be associated with one or more makes which those dealers sell. One of these makes may be selected as the make of interest. As the set of dealers may be dealers for multiple makes, multiple CCZs for the first set of dealers may be determined with respect to the zip code of interest for each make which the set of dealers carry, a subset of these makes, or only for the particular make of interest.

At step 620, a zip code of interest may be determined. As the purpose of a CCZ may be to determine how dealers within a particular set (the first set or set of interest) are faring with respect to dealers in another set (the second or other set), a CCZ may be determined for the set of dealers with respect to each zip code in a set of zip codes. In one embodiment, the set of zip codes may be all the zip codes in the country or a subset of zip codes. Thus, to determine a zip code of interest, a zip code may be selected from the set of zip codes.

At step 630 the distance from the zip code of interest to the nearest dealer (e.g., for the make of interest) in the set of interest and the distance from the zip code of interest to the nearest dealer (e.g., for the make of interest) in second set may be determined. This distance data may be, for example, have been previously obtained from map data or the like and stored at a vehicle data system.

At step 640 then, the typical distance for the zip code of interest may be determined. This typical distance may be a measure of the typical distance a consumer in the zip code of interest would travel to purchase a vehicle of the make of interest (e.g., the make associated with the first dealer set as determined at step 615). This typical distance may be determined from historical transaction records for consumers living in the zip code of interest as determined from records of the DMV, dealers or other data sources. In some embodiments, the historical transaction data used to make a determination for the typical distance may be constrained by time such that only historical transaction data from within a certain time frame (e.g., two years) may be utilized.

Using this historical transaction data, a vector of distances for each sale may be determined. Each distance in the vector is a distance traveled by a consumer in the zip code of interest to purchase a vehicle of the make of interest. As discussed, the median distance of the vector of distances may be used as the typical distance.

Mean distance of the vector of distances may also be used. Other determinations of the typical distance may be utilized in other embodiments and are fully contemplated herein.

In one embodiment, a threshold number of vehicle sales may be utilized. This threshold may be 10 sales, 50 sales, 100 sales or some other threshold. If there are too few records of sales (e.g., less than the threshold number of vehicle sales) to compute a typical distance (e.g., mean or median), the typical distance can be determined as a weighted average of the distance of a number of closest dealers to a zip code. The number of closest dealer may be, for example, a number (e.g., 5, 10, 50, 100, etc.) of dealers closest to the zip code (e.g., the centroid of the zip code), or all dealers within a certain distance (e.g., 5 miles, 10 miles, 50 miles, etc.) of the zip code of interest.

At step 650 then the CCZ for the dealers in the first set of dealers for the make and the zip code of interest can be determined according to EQ2 above by using the distance from the zip code of interest to the nearest dealer of the first set of dealers, the distance from the zip code to the nearest dealer in the second set of dealers and the typical distance.

At step 660, this CCZ may be utilized in one or more other calculations or determinations. The use of the CCZ may include the classification or qualification or quantization of new or previously determined data based on the CCZ. For example, in one embodiment, the determined CCZ value for the zip code of interest for the set of dealers and make of interest may be utilized to classify the zip code of interest into a zone associated with set of dealers or may be used in one or more other calculations or determinations. As another example, the CCZ value in the zip code may be utilized to determine a predicted increase in sales from adding a dealer (e.g., a general dealer not already in a dealer network or a specific dealer) to a dealer network associated with the first set of dealers.

Referring back to FIG. 5, the same diagram may be useful in illustrating an example of a CCZ calculation for a set of dealers. Accordingly, assume for purposes of this example that dealers B and C belong to the TrueCar dealer network (the first set of dealers) and dealers A and D do not (the second set of dealers). As data related to how TrueCar performs in 90001 is desired, the closest TrueCar dealer (dealer C) and the closest non TrueCar dealer (dealer A) can be determined and EQ2 above applied: but centered on the first set of dealers and based on the closest dealers of each set:

$$CCZ(\text{TrueCar}, 90001) =$$
$$\frac{\text{distance(dealer } C, 90001) - \text{distance(dealer } A, 90001)}{\text{typical distance for } 90001} =$$
$$\frac{8 \text{ mi} - 2 \text{ mi}}{2 \text{ mi}} = 3.0$$

Notice that for both DCZ and CCZ, depending on how the distances are taken, it is possible that the typical distance may be zero. For example, if everything in a zip code is referenced by a single point (e.g. the centroid of the zip code) it follows that customers buying in the same zip code they live will appear to have displaced 0 miles. This can be corrected by replacing 0 miles by a positive value (e.g., 1 mile) to avoid division by zero.

CCZ may be used to assess the strengths and weaknesses of a dealer network, allowing easier identification of areas where the dealer network has a high or low penetration. This, in turn, may allow a dealer network to more optimally expand its coverage by adding dealerships in areas with a weak coverage.

It may now be useful to discuss embodiments of the uses of the DCZ or CCZ in more detail. While these are some example uses of the DCZ and CCZ it will be understood that these indices may be used in a wide variety of calculations to account for geography or density of populations or dealerships. In particular, in one embodiment the two indices (e.g., DCZ and CCZ) as described above may facilitate comparisons of dealers across the country or may be used to normalize other calculation. In particular, both DCZ and CCZ enable more accurate performance predictions, reducing noise and accounting for local behavioral patterns. For example, a typical performance indicator is close rate, which can be modeled or predicted as a function of DCZ.

The DCZ or CCZ can also be used to define dealers' areas of influence (e.g., associated with certain zip codes). For example, the DCZ or CCZ for a dealer may be used to define different zones of comparative advantage or disadvantage. In one embodiment, the DCZ or CCZ for a dealer and make with respect to a zip code may be used to define or associate zone labels with that zip code for that dealer. For example, the CCZ or DCZ for a zip code may be utilized to define the zip code as a 'backyard' zone where the dealer has a geographical advantage compared to the competition, a 'competitive' zone where the dealer is at a comparable distance with other dealers and a 'conquest' zone where the dealer is in disadvantage in terms of distance. Different, fewer or additional zones may also be utilized based on the DCZ values for a dealer for a make and a zip code. Additionally, instead of a single 'conquest' zone for use with geographic areas (e.g., zip code) where the dealer is at a disadvantage in terms of distance; 'conquest far' and 'conquest near' zones may be utilized, both designating that the dealer is at a disadvantage, but denoting a comparative advantage or disadvantage between the 'conquest near' and 'conquest far' zones. These zones allow dealers to better understand their market and allow better evaluation of dealer performance.

Figure 7B:
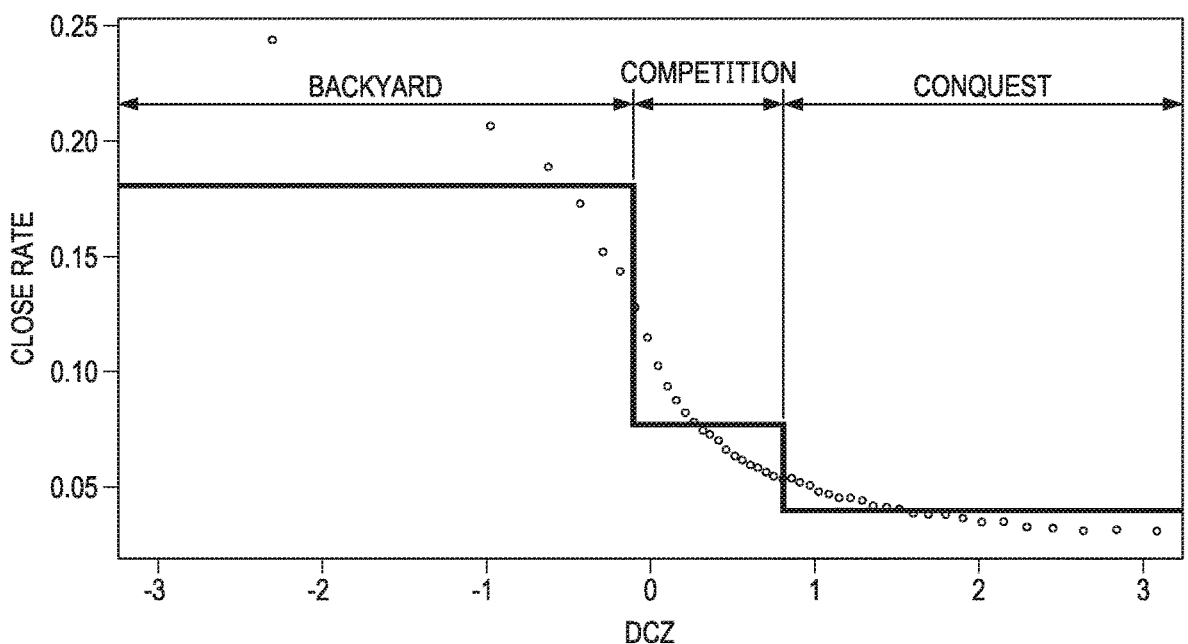
FIG. 7B is a diagram depicting an example of close rate as a function of DCZ and associated zone labels.
Figure 7A:
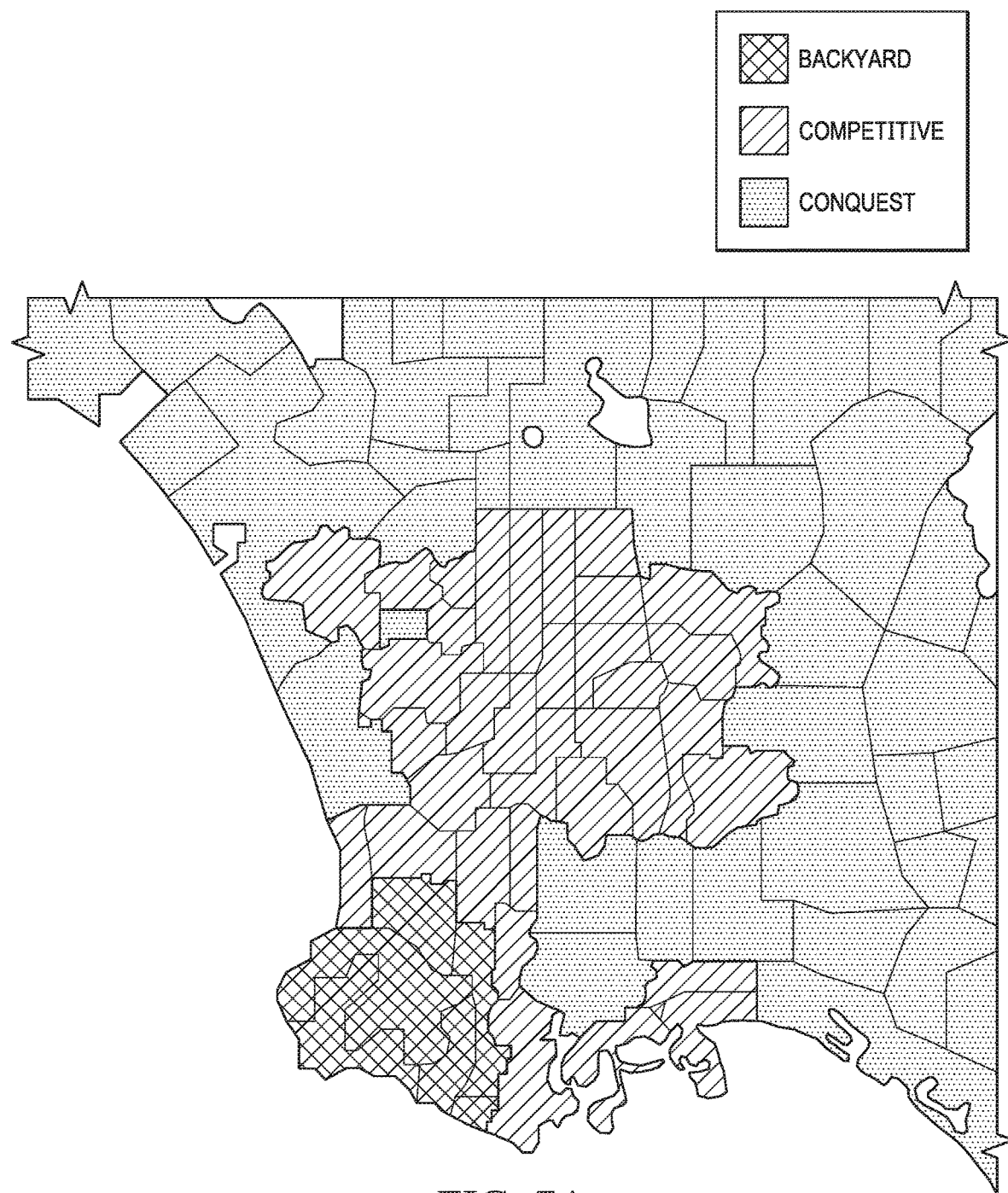
FIG. 7A is a diagram depicting an embodiment of competition zones.

Competitive zones values or labels can be used to create maps and aggregate the space into regions of similar performance for a dealer. This discretization can happen in different ways in different embodiments, but in one embodiment a small number of areas may be preferred since they better convey meaning to vehicle dealers. FIG. 7A shows an example of competitive zone labels for a dealer in zip code 90505. The area is discretized into backyard, competitive and conquest regions.

It will be noted that close rate can be modeled as a function of CCZ or DCZ. The definition of these zones in this example is tied to the DCZ-close rate relationship (as seen in FIGS. 7B) and depends on a set of cutoff values that define what label to assign to zip code based on an associated DCZ value determined for a dealer in that zip code for a make. A similar exercise is possible for CCZ values. In other words, zones may be labeled for a dealer or set of dealers based on the DCZ values, DCZ close-rate relationship, CCZ values or the CCZ-close rate relationship.

As discussed, in one embodiment, the DCZ index provides a numerical value for each or, or a set of, the dealer-zip code pairs in the country for each of a set of makes. This index is then transformed into a categorical zone label ('backyard', ' competitive', ' conquest') that defines dealers' areas of influence. From a high level standpoint, the dealer's areas of influence can be interpreted in the following way (see e.g., FIG. 7B): the 'backyard' zone corresponds to the zip codes where the dealer has a geographical advantage compared to the competition; the 'competitive' zone corresponds to the zip codes where the dealer is at a comparable distance with other dealers; and the 'conquest' zone corresponds to the zip codes where the dealer is in disadvantage in terms of distance.

A two-step process may be used to convert the DCZ or CCZ Index for a zip code into these zip code labels for areas of influence. At step one a first set of temporary labels are defined for each dealer-zip code pair using the following logic:

| Index Range | Temporary Label |
| --- | --- |
| DCZ ≤ 0 | Backyard |
| 0 < DCZ ≤ 1 | Competitive |
| 1 < DCZ | Conquest |

In other words, if the DCZ value for a zip code for a dealer and make falls into a particular index rage it is assigned the corresponding temporary label. This table corresponds to the depiction of competitive zones in FIGS. 7A and 7B. These definitions translate into index ranges the intuition described above: the backyard zone corresponds to the area where the dealer is the closest dealer to the customer; the competitive zone is the area where the dealer's distance to the customer is similar to the closest dealer's distance; and the conquest zone is the area where the dealer is farther from the customer compared to the competition.

In another embodiment, the labels may be assigned as follows, where the "conquest" zone has been broken up into two conquest zones, "conquest near" and "conquest far."

| Index Range | Temporary Label |
|---|---|
| DCZ ≤ 0 | Backyard |
| 0 < DCZ ≤ 1 | Competitive |
| 1 < DCZ ≤ 3 | Conquest Near |
| 3 < DCZ | Conquest Far |

At step two, one or more rules may be utilized to assign, define or refine competitive zones labels. As but one example, a rule may dictate that if a zip code is labeled as a backyard for one dealer it must be a conquest for all other competing dealer (e.g., of the same make). This rule translates the fact that the backyard zone should be the area where the dealer is in very clear advantage compared to the competition. In this area, he is not "competing" with other dealers.

In particular, after the temporary labeling defined in step one, it is possible that a zip code is labeled as backyard for one dealer and competition for at least another dealer. This case may be referred to a "conflict zip codes". In one embodiment, a second relabeling step is defined to take into account the business rule and solve the conflicts.

Consider a conflict zip code. Assume, for example, that dealer B has a DCZ value of $d_B \leq 0$ and that it is thus labeled as "backyard", and that dealer C has a DCZ value of $d_c \in [0,1]$ and it is labeled as competitive. There are two possible ways of solving the problem: 1) if dealer B has a significantly stronger influence than dealer C in the zip code, then the zip code label for dealer B should stay "backyard", and dealer C's label should be switched to "conquest" for the zip code, and 2) if dealer B and C seem to have a similar influence in the zip code, then both dealers should be considered as "competitive" for the zip code.

To measure dealers' "influence" in a conflict zip code two metrics may be analyzed in one embodiment: dealer market share and DCZ index value. The dealer market share at a zip code level is defined as:

$$\text{Market}_{share(dealer,zip)} = \text{Number of vehicles sold by dealer to a customer in zip/Number of vehicles bought by customers in zip} \quad (EQ3)$$

Intuitively, a dealer with high market share is very influential in the zip code.

To re-label a zip code then (e.g., from the temporary label assigned to the zip code), the vehicle data system may employ relabeling rules that first looks at market share (when there are enough transactions in the zip codes for it to be meaningful). In one embodiment, these rules may specify that if dealer B has a significantly higher market share than dealer C, then dealer C is relabeled as conquest. Otherwise dealer B is relabeled as competitive.

In cases where there may not be sufficient transactions to compute a meaningful market share, the relabeling may be based on DCZ Index. The approach is similar: if dealer B has a very low DCZ value (which should indicate that it is significantly closer to the consumer) then dealer C is relabeled as conquest. Otherwise dealer B is relabeled as competitive.

In one particular embodiment the method for relabeling may be expressed as follows:
  relabeling for zip, make considered as backyard for one dealer and competitive for at least one other dealer (using temp_label)
  variables:
  total_sales: total sales for make m in zip code z
  back_ms: market share for dealer considered as backyard in zip code z and make m
  comp_ms: maximum (market share of dealers considered as competitive for zip code z and make m)
  dcz_back: dcz index of dealer considered as backyard
  min_dcz_comp: min dcz of dealers considered as competitive parameters:
  thres0=0
  thresh1=1
  MS_thresh1=40%
  MS_thresh2=1.2
  min_sales=50
  def
  winner (back_ms, comp_ms, total_sales, dcz_back, min_dcz_comp):
    if total_sales>=min_sales:
      if back_ms>=MS_thresh1:
        return "Backyard"
      elif back_ms>=MS_thresh2*comp_ms:
        return "Backyard"
      else:
        return "Competitive"
    else:
      if (thresh1-dcz_back)>=(thresh2-min_dcz_comp):
        return "Backyard"
      else:
        return "Competitive"

The previous function decides who is the 'winner' of the conflict.
  if winner='Backyard' then the competitive zips gets relabeled as 'conquest'
  if winner='Competitive' then the backyard zip gets relabeled as 'competitive'

It may now be useful to illustrate how features determined for a dealer, including features based on DCZ values, CCZ values or zone labels determined in association for a dealer may be presented to a dealer through an interface by a vehicle data system. In one embodiment, for example, a graphical display in an interface presented to a user may present the zone labels for a set of zip codes in the vicinity of the dealer. Such a presentation may include, for example, a depiction of a zip code map and a coded presentation of the zone labels along with graphical depiction of the various dealers in the geographic region. Graphical depictions may also be used in the interface to depict other features for the dealer (or other dealers), such as coded depictions of close rate or relative performance, etc. Features associated with the dealer, including textual display of data associated with the determination of the DCZ values, CCZ values, zone labels or other data may also be presented in the interface.

Figure 8:
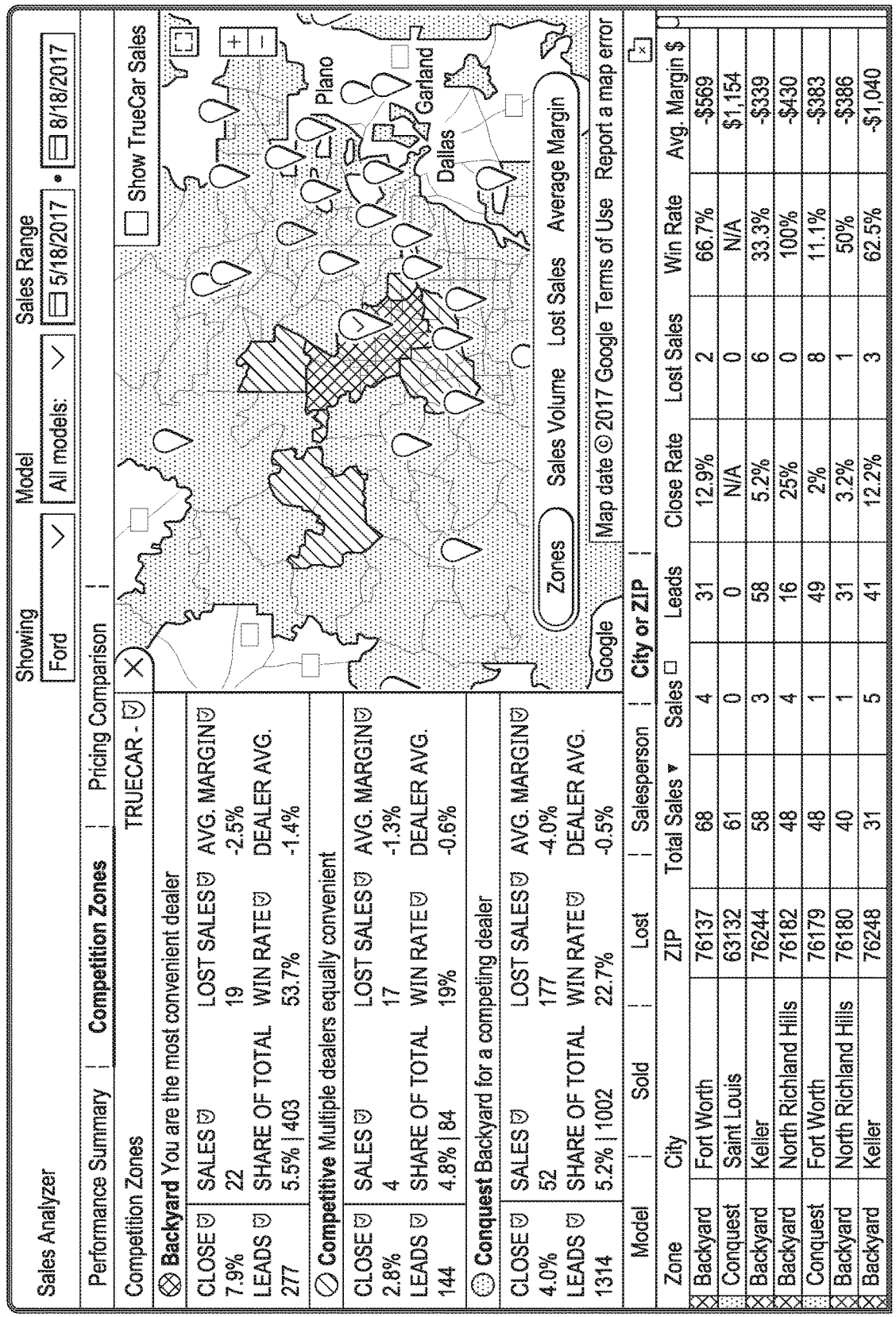
FIGS. 8 and 9 depict embodiments of interfaces that may be utilized by a vehicle data system.

FIG. 8 depicts one embodiment of such an interface. Embodiments of these types of interfaces may be presented as a portion of one or more tools that are offered to vehicle dealers (e.g., to dealers in a dealer network by a provider, administrator, coordinator, etc. of a dealer network) that allows dealers to see key performance indicators (e.g., presented according to competition zone labels assigned to zip codes or other geographic areas of interest to the dealer). A user associated with a dealer may thus access the interface at a vehicle data system such that the vehicle data system can identify the dealer (e.g., as a dealer of interest). An interface similar to that presented in FIG. 8 may then be presented to the user.

In particular, the interface may allow the dealer to enter a make of interest and based on the make of interest, depict the area of influence of the dealer on a map depicting geographic area (e.g., zip codes), coloring or shading the zip codes according to the competition zone labels determined for the dealer and make based on the CCZ or DCZ score determined for the dealer and make in the zip code. The interface may also present a table summarizing the dealer's performance by competition zone (e.g., in the example depicted, the table is presented at the left of the map) as well as a break down by zip code of the dealers (bottom of the dashboard). Interfaces of this type may thus effectively be utilized by dealers to understand the effects of distance and the density and distribution of competitors in its area of influence.

Figure 9:
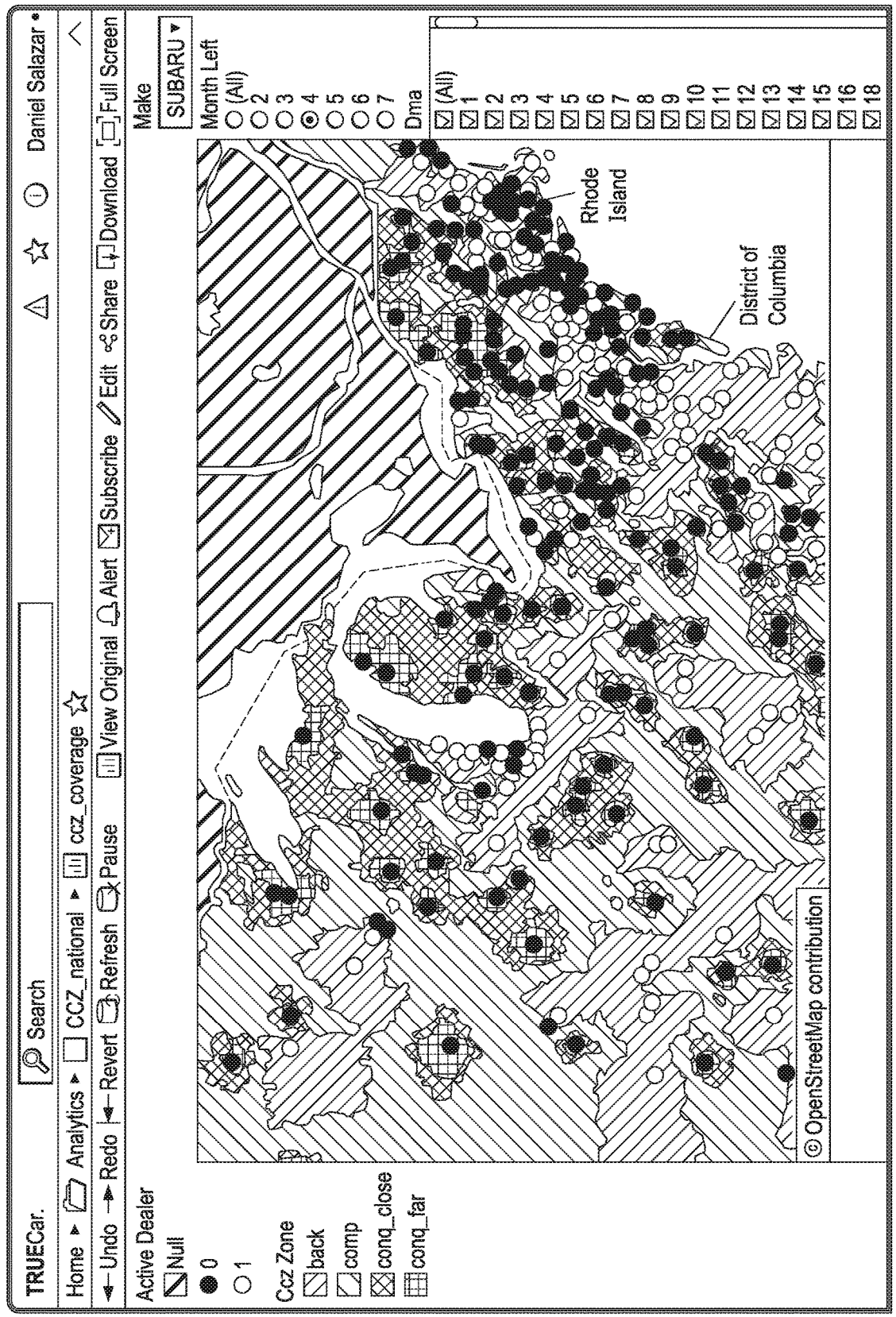

FIG. 9 presents one embodiment of a similar interface presented by a vehicle data system that applies the CCZ values to depict geographical coverage. The interface may allow a user to select the automaker (e.g., a "Make" drop-down window) and shows for each zip code a color coded or shaded version of the CCZ index value. A zip code colored in green (or shaded in a certain manner) may denote an area where at least one TrueCar dealer (e.g., a dealer who is a member of the TrueCar dealer network) is the closest available dealer for that make to that region; yellow areas (or shaded in a certain manner) may indicate a CCZ index between 0 and 1, corresponding to regions where no TrueCar dealer is the closest but getting to the closest TrueCar requires driving no more than twice the distance people in those areas usually drive to buy cars of the selected make. Finally, orange or red postal codes (or shaded in a certain manner) indicate zones with no TrueCar dealer is relatively close. By looking at the dashboard, users can quickly understand what areas have a convenient TrueCar dealer nearby. Also, this information can be matched against visitors to a web site (e.g., TrueCar.com) to quantify how many times a site visitor is in the vicinity of a TrueCar dealer, also known as 'backyard coverage'

While certain embodiments of the use of the competition zones, DCZ and CCZ have been described many other uses are contemplated herein. For example, competition zones may be usefully applied for dealer targeting.

Specifically, in order to expand a network of certified dealers, a scheduled process may be used to evaluate the strategic worth of each dealer based on the individual sales and the network level sales that such dealer will bring to the dealer network. Competition zone derived algorithms may be used to assess individual level and network level sales respectively.

As another example, competition zones may be used to evaluate subscription rates. Dealers opting for the subscription fee model are assigned a fee that is proportional to the estimated monthly sales.

In still another example, competition zones may be used for dealer performance assessment. Traditionally dealers assess their performance looking at overall close rate in certain amount of miles. By using zone labels instead of arbitrary radii better insights to dealers into the basic key performance indicators, like number of leads and conversion rate may be presented to dealers.

As yet another example, competition zones may be used for a dealer scorecard. Competition zone labels may be used to compare a dealer against its competitors. A dashboard can be presented by a vehicle data system that shows how many sales a competitor is obtaining from the dealer's backyard and vice-versa.

As one more example, CCZ values may be used to generate and present coverage maps (e.g., by zip code or make) for network dealers (e.g., a TrueCar coverage map).

Similarly, the "value" of a dealer to a dealer network may be assessed (e.g., the impact of the dealer on the dealer network). Specifically, the impact assessment of dealers dropping of the dealer network may be determined.

As still one more example, a dealer selection algorithm may utilize the competition zone values. Such a dealer selection method may select what dealers to display or recommend to customers interacting with a vehicle data system based on the make and models and zip selected during the customer's search as well as the search zip code. For example, competition zone indices may be used to determine the search zip code any dealer is eligible to be displayed for.

Embodiments of a hardware architecture for implementing certain embodiments is described herein. One embodiment can include one or more computers communicatively coupled to a network. As is known to those skilled in the art, the computer can include a central processing unit ("CPU"), at least one read-only memory ("ROM"), at least one random access memory ("RAM"), at least one hard drive ("HD"), and one or more input/output ("I/O") device (s). The I/O devices can include a keyboard, monitor, printer, electronic pointing device (such as a mouse, trackball, stylist, etc.), or the like. In various embodiments, the computer has access to at least one database over the network.

ROM, RAM, and HD are computer memories for storing computer instructions executable (in other which can be directly executed or made executable by, for example, compilation, translation, etc.) by the CPU. Within this disclosure, the term "computer-readable medium" is not limited to ROM, RAM, and HD and can include any type of data storage medium that can be read by a processor. In some embodiments, a computer-readable medium may refer to a data cartridge, a data backup magnetic tape, a floppy diskette, a flash memory drive, an optical data storage drive, a CD-ROM, ROM, RAM, HD, or the like.

At least portions of the functionalities or processes described herein can be implemented in suitable computer-executable instructions. The computer-executable instructions may be stored as software code components or modules on one or more computer readable media (such as non-volatile memories, volatile memories, DASD arrays, magnetic tapes, floppy diskettes, hard drives, optical storage devices, etc. or any other appropriate computer-readable medium or storage device). In one embodiment, the computer-executable instructions may include lines of complied C++, Java, HTML, or any other programming or scripting code.

Additionally, the functions of the disclosed embodiments may be implemented on one computer or shared/distributed among two or more computers in or across a network. Communications between computers implementing embodiments can be accomplished using any electronic, optical, radio frequency signals, or other suitable methods and tools of communication in compliance with known network protocols.

As used herein, the terms "comprises," "comprising," "includes," "including," "has," "having" or any other variation thereof, are intended to cover a non-exclusive inclusion. For example, a process, process, article, or apparatus that comprises a list of elements is not necessarily limited only those elements but may include other elements not expressly listed or inherent to such process, process, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

Additionally, any examples or illustrations given herein are not to be regarded in any way as restrictions on, limits to, or express definitions of, any term or terms with which they are utilized. Instead, these examples or illustrations are to be regarded as being described with respect to one particular embodiment and as illustrative only. Those of ordinary skill in the art will appreciate that any term or terms with which these examples or illustrations are utilized will encompass other embodiments which may or may not be given therewith or elsewhere in the specification and all such embodiments are intended to be included within the scope of that term or terms. Language designating such nonlimiting examples and illustrations includes, but is not limited to: "for example," "for instance," "e.g.," "in one embodiment."

Benefits, other advantages, and solutions to problems have been described above with regard to specific embodiments. However, the benefits, advantages, solutions to problems, and any component (s) that may cause any benefit, advantage, or solution to occur or become more pronounced are not to be construed as a critical, required, or essential feature or component.

What is claimed is:

1. A vehicle data system utilizing spatial or geography based metrics in a distributed computing environment, comprising:
   a data store;
   a computing device coupled to a plurality of distributed data sources over a network; and
   a non-transitory computer readable medium comprising instructions for:
   generating a real-time interface comprising competition zone information for a geographic area, the competition zone information associated with a dealer and a vehicle make, wherein the competition zone information is determined based on a competition zone index or zone label associated with the geographic area by:
      obtaining a set of historical transaction data associated with the vehicle make, wherein the set of historical transaction data was obtained from a distributed data source, the historical transaction data comprising data on transactions associated with vehicles of the vehicle make;
      utilizing the obtained historical transaction data associated with the vehicle make, determining a normalization metric comprising a competition zone index for the dealer, the geographic area and the vehicle make, the competition zone index quantifying the competitiveness of the dealer in the geographic area, wherein the competition zone index is determined based on a historical distance traveled to purchase a vehicle of the vehicle make; and
      assigning the zone label to the geographic area for the dealer and vehicle make based on the competition zone index determined for the geographic area for the dealer and vehicle make;
   receiving a request over a network, the request associated with the dealer;
   identifying the geographic area associated with the dealer; and
   responding to the request with the generated real-time interface over the network, the generated real-time interface providing a visual representation of the competition zone information.

2. The system of claim 1, wherein the interface provides the visual representation that includes a visual representation of the geographic area and the zone label of the geographic area associated with the dealer and the vehicle make.

3. The system of claim 1, wherein the competition zone index is determined further based on a second dealer that is a closest dealer to the dealer.

4. The system of claim 1, wherein the zone label designates where the dealer has a geographical advantage, where the dealer is at a comparable distance with other dealers, or where the dealer is at a disadvantage relative to at least one other dealer.

5. The system of claim 1, wherein the zone label is associated with a competition index value.

6. The system of claim 1, wherein the interface is a graphical interface.

7. A method, comprising:
   generating, by a computing device, a real-time interface comprising competition zone information for a geographic area, the competition zone information associated with a dealer and a vehicle make, wherein the competition zone information is determined by one or more processors based on a competition zone index or zone label associated with the geographic area by:
      obtaining a set of historical transaction data associated with the vehicle make, wherein the set of historical transaction data was obtained from a distributed data source, the historical transaction data comprising data on transactions associated with vehicles of the vehicle make;
      determining a normalization metric comprising a competition zone index for the dealer, the geographic area and the vehicle make, the competition zone index quantifying the competitiveness of the dealer in the geographic area, wherein the competition zone index is determined based on a historical distance traveled to purchase a vehicle of the vehicle make; and
      assigning the zone label to the geographic area for the dealer and vehicle make based on the competition zone index determined for the geographic area for the dealer and vehicle make;
   receiving a request over a network, the request associated with the dealer;
   identifying the geographic area associated with the dealer; and
   responding to the request with the generated real-time interface over the network, the generated real-time interface providing a visual representation of the competition zone information.

8. The method of claim 7, wherein the interface provides the visual representation that includes a visual representation of the geographic area and the zone label of the geographic area associated with the dealer and the vehicle make.

9. The method of claim 7, wherein the competition zone index is determined further based on a second dealer that is a closest dealer to the dealer.

10. The method of claim 7, wherein the zone label designates where the dealer has a geographical advantage, where the dealer is at a comparable distance with other dealers, or where the dealer is at a disadvantage relative to at least one other dealer.

11. The method of claim 7, wherein the zone label is associated with a competition index value.

12. The method of claim 7, wherein the interface is a graphical interface.

13. A non-transitory computer readable medium storing instructions that are executable by a processor for:
   generating a real-time interface comprising competition zone information for a geographic area, the competition zone information associated with a dealer and a vehicle make, wherein the competition zone information is determined based on a competition zone index or zone label associated with the geographic area by:
- obtaining a set of historical transaction data associated with the vehicle make, wherein the set of historical transaction data was obtained from a distributed data source, the historical transaction data comprising data on transactions associated with vehicles of the vehicle make;
- determining a normalization metric comprising a competition zone index for the dealer, the geographic area and the vehicle make, the competition zone index quantifying the competitiveness of the dealer in the geographic area, wherein the competition zone index is determined based on a historical distance traveled to purchase a vehicle of the vehicle make; and
- assigning the zone label to the geographic area for the dealer and vehicle make based on the competition zone index determined for the geographic area for the dealer and vehicle make;

receiving a request over a network, the request associated with the dealer;

identifying the geographic area associated with the dealer; and responding to the request with the generated real-time interface over the network, the generated real-time interface providing a visual representation of the competition zone information.

14. The non-transitory computer readable medium of claim 13, wherein the interface provides the visual representation that includes a visual representation of the geographic area and the zone label of the geographic area associated with the dealer and the vehicle make.

15. The non-transitory computer readable medium of claim 13, wherein the competition zone index is determined further based on a second dealer that is a closest dealer to the dealer.

16. The non-transitory computer readable medium of claim 13, wherein the zone label designates where the dealer has a geographical advantage, where the dealer is at a comparable distance with other dealers, or where the dealer is at a disadvantage relative to at least one other dealer.

17. The non-transitory computer readable medium of claim 13, wherein the zone label is associated with a competition index value.

18. The non-transitory computer readable medium of claim 13, wherein the interface is a graphical interface.

* * * * *